United States Patent [19]

Hattori et al.

[11] Patent Number: 4,838,845

[45] Date of Patent: Jun. 13, 1989

[54] POWER TRANSMITTING V-BELT

[75] Inventors: Torao Hattori, Saitama; Minoru Nishimura, Kanagawa; Masaki Goto, Shizuoka, all of Japan

[73] Assignee: Honda Giken Kogyo Kabushiki Kaisha, Tokyo, Japan

[21] Appl. No.: 213,167

[22] Filed: Jun. 29, 1988

[30] Foreign Application Priority Data

Jul. 3, 1987 [JP] Japan .............................. 62-101806[U]

[51] Int. Cl.$^4$ ................................................. F16G 1/22
[52] U.S. Cl. ....................................... 474/242; 474/201
[58] Field of Search ................. 474/201, 237, 240–246

[56] References Cited

U.S. PATENT DOCUMENTS

4,552,548 11/1985 Hattori ................................ 474/201
4,698,050 10/1987 Hattori et al. ...................... 474/242
4,741,727 5/1988 Hattori et al. .................. 474/242 X
4,758,211 7/1988 Hattori ........................... 474/201 X

*Primary Examiner*—Thuy M. Bui
*Attorney, Agent, or Firm*—Lyon & Lyon

[57] ABSTRACT

A power transmitting V-belt comprising an endless metal band held by stopper members on a multiplicity of V-shaped metal blocks which are linked to one another, wherein a pair of free ends of each stopper member are retained in a pair of retaining grooves on the associated metal block, which pair of retaining grooves include a tapered guide section adapted to guide the free ends of the stopper member from its free state to its stressed state retained in the retaining grooves at the time of mounting the stopper member to the metal block. This simplifies the assembling procedure.

6 Claims, 8 Drawing Sheets

POWER TRANSMITTING V-BELT

BACKGROUND OF THE INVENTION

1. FIELD OF THE INVENTION

The present invention relates to a power transmitting V-belt and more particularly to a power transmitting V-belt which is used in combination with a variable diameter V-pulley.

2. DESCRIPTION OF THE PRIOR ART

Conventionally various kinds of examples have been disclosed as power transmitting V-belts of this type which are usable in combination with variable diameter V-pulleys for a vehicular V-belt type continuously variable transmission, for example.

Such V-belts are usually constructed by restraining and mounting a metal band, obtained from a plurality of laminated endless metal band elements, to a multiplicity of V-shaped metal blocks which are disposed adjacent to each other.

Figure 15:
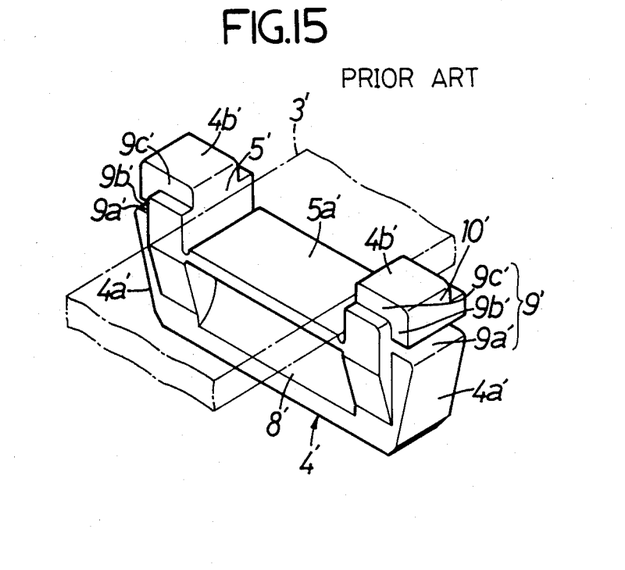
FIGS. 15 and 16 are respective perspective views of a V-shaped metal block and a stopper member according to the prior art.
Figure 16:
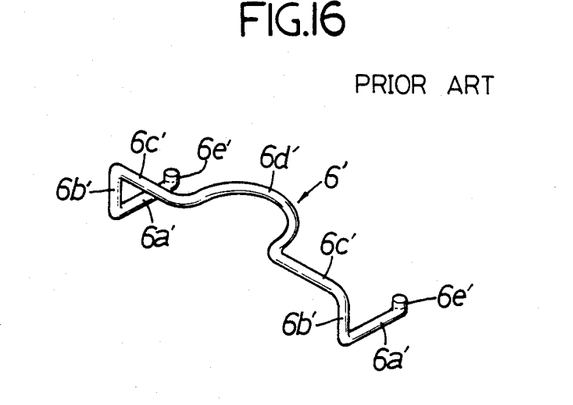

FIGS. 15 and 16 of the accompanying drawings show perspective views of one kind of V-shaped metal block and a stopper member for restraining and mounting a metal band to the V-shaped metal block, respectively, which have been disclosed by the present inventors in Japanese utility model application Kokai No. 79038/1985.

As shown in FIG. 15, a V-shaped metal block 4' according to this prior art has on its upper part a recessed groove 5' which opens upwardly and the bottom surface of the recessed groove 5' serves as a band supporting surface 5a' for receiving and supporting thereon the lower surface of a metal band 3' shown by one-dot-chain line. The opposite side surfaces of the V-shaped metal block 4' facing in the longitudinal direction of the metal band 3' are provided with semi-cylindrical recesses 8', 8', respectively. Cylindrical roller members, not shown, are interposed between and engaged in the opposed recesses 8', 8' of adjacent V-shaped metal blocks to obtain a connected or linked state of these blocks. Alternatively, the roller members may be omitted and a semi-cylindrical projection may be projected from one of the opposite side surfaces of the V-shaped metal block 4' in place of the recess. In this case, the connection or linkage between adjacent metal blocks is obtained by abutting the projection against the opposed recess of an adjacent metal block. The V-shaped metal block 4' is further provided with inclined parts 4a', 4a', on opposite end surfaces in the widthwise direction of the band 3'. The inclined parts 4a', 4a' come into engagement with a V-grooved surface of a V-pulley not shown.

In any of the afore-mentioned types, the conventional V-shaped metal block 4' includes, like the illustrated example, a pair of retaining grooves 9', 9' which open to upper wall parts 4b', 4b' disposed on the opposite ends of the metal block 4' in the widthwise direction of the band. By bringing opposite free ends of a stopper member 6' shown in FIG. 16 into engagement with the retaining grooves 9', 9', the metal band 3' is held on the band supporting surface 5a' of metal block 4'. More specifically, each retaining groove 9' comprises a longitudinal groove portion 9a' which extends in the longitudinal direction of the metal band 3' at a position above the inclined part 4a' and below a side surface 10' which is provided on each end of the metal block, a vertical groove portion 9b' extending upwards from a position near one end of the longitudinal groove portion 9a', and a lateral groove portion 9c' extending from the upper end of the vertical groove portion 9b' in the widthwise inward direction of the metal band 3' and opening to the recessed groove 5'. The lateral groove portion 9c' has the same width as the vertical groove portion 9b' and is open to the upper wall part 4b' over its whole length.

Each of the free ends of stopper member 6' which are engaged in the retaining grooves 9', 9' in assembly includes a longitudinal portion 6a' *corresponding to the longitudinal groove portion 9a'*, a vertical portion 6b' standing upwards from one end of the longitudinal portion 6a' and corresponding to the vertical groove portion 9b', and a horizontal portion 6c' bent horizontally from the upper end of the vertical portion 6b' and corresponding to the lateral groove portion 9c'. The horizontal portions 6c' and 6c' of the pair of free ends are connected together via a central portion 6d' which is curved into a semi-circular shape. In case of the illustrated prior art structure, the free ends of stopper member 6' further include bent portions 6e', 6e' at tips of the longitudinal portions 6a', 6a', respectively.

Owing to the above-described arrangement, this prior art enjoys an advantage that the height of the upper wall part 4b', that is, the total height of the V-shaped metal block 4' can be reduced. However, it still suffers from the problem that the assembling process is troublesome, as will be discussed below in detail. That is, when mounting the stopper member 6' thus constructed to the V-shaped metal block 4', both the longitudinal portions 6a', 6a' of the member 6' are first expanded in its free state in the lateral opposite directions or in the directions apart from the central portion 6d' and the stopper member 6' is in such expanded state moved down from above onto the upper wall parts 4b', 4b' of V-shaped metal block 4' to cause longitudinal portions 6a', 6a' to slide down the pair of side surfaces 10', 10' of metal block 4'. The longitudinal portions 6a', 6a' are further moved down and brought into fitting engagement with the longitudinal groove portions 9a', 9a' which are at the lower ends of the side surfaces 10', 10'. Through this operation, the vertical portions 6b', 6b' and horizontal portions 6c', 6c' also simultaneously come into engagement with the vertical groove portions 9b', 9b' and lateral groove portions 9c', 9c' of the retaining grooves 9', 9', whereby the stopper member 6' is fixed on the metal block 4'. In this assembled state, the bent portions 6e', 6e' provided at the tips of free ends of the stopper member 6' abut against that surface of the metal block 4' opposite to the surface on which the vertical groove portions 9b', 9b' are provided, thus restricting movements of the stopper member 6' in the longitudinal direction of the metal band 3'.

Since the opposite free ends of stopper member 6' are thus largely expanded at the time of assembling operation, if the member has been designed to have a relatively small resiliency, there may be encountered a case where expanding of the free ends exceeds the elastic limit thereof. Moreover, a large operational force and a skilled art are required for carrying out the assembling operation.

There has also been used instead of the afore-mentioned type of stopper member 6' such a stopper member that is devoid of bent portions 6e', 6e' at its free ends and is terminated by the longitudinal portions 6a', 6a'. When a stopper member of the latter type is mounted to the V-shaped metal block 4', it is not required to expand its free ends up to the full width between the side surfaces 10', 10' of metal block 4' but it is enough to expand them to the distance between the pair of vertical groove portions 9b', 9b'. The expanded free ends are engaged at their tips with the vertical groove portions 9b', 9b' and then the stopper member is forced downwards to a position near one end of each of the longitudinal groove portions 9a', 9a'. Thereafter, the tips of stopper member are pressed into the longitudinal groove portions 9a', 9a'.

The stopper member having no bent portions, however, still necessitates the step of expanding the member in a free state like the first-mentioned type and a dexterous operation is required for pushing the stopper member downwards along the vertical groove portions 9b', aligning the free end tips of the member with the longitudinal groove portions 9a' and forcing them into the groove portions 9a'.

SUMMARY OF THE INVENTION

The present invention has been developed in view of the above problems pertaining to the prior art and its object is to provide power transmitting V-belt formed of V-shaped metal blocks which are free of the above disadvantages and are easy to be equipped with stopper members.

In order to achieve the above object, the present invention proposes a power transmitting V-belt comprising V-shaped metal blocks, each of the metal blocks including a pair of retaining grooves distanced from each other for receiving a pair of free ends of an associated stopper member, the pair of retaining grooves having parts which cooperate together to form a tapered guide section adapted to guide the pair of free ends of the stopper member from a free state thereof to the position retained in the retaining grooves at which the free ends are given stress therein.

With the above arrangement, it becomes unnecessary to expand the free ends of the stopper member in its free state when the member is mounted on the V-shaped metal block and the stopper member can, with the help of the tapered guide section formed by the pair of retaining grooves, be swiftly moved into the retained position wherein stress is given to the stopper member. This serves to improve the assembling property and reduce the production cost.

The above and other objects, features and advantages of the invention will be apparent from reading of the following detailed description of a preferred embodiment made in conjunction with the accompanying drawings.

BRIEF DESCRIPTION OF THE DRAWINGS

FIGS. 2 –7 show respective projections and a section of the metal block, of which

DESCRIPTION OF PREFERRED EMBODIMENT

FIGS. 1 –14 show one preferred embodiment of a power transmitting V-belt according to the invention.

Figure 9:
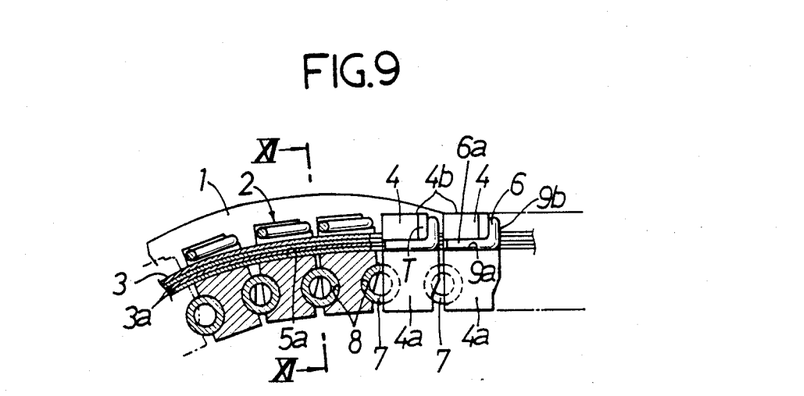
FIG. 9 is a partially cutaway side view of a part of V-belt according to this embodiment.
Figure 10:
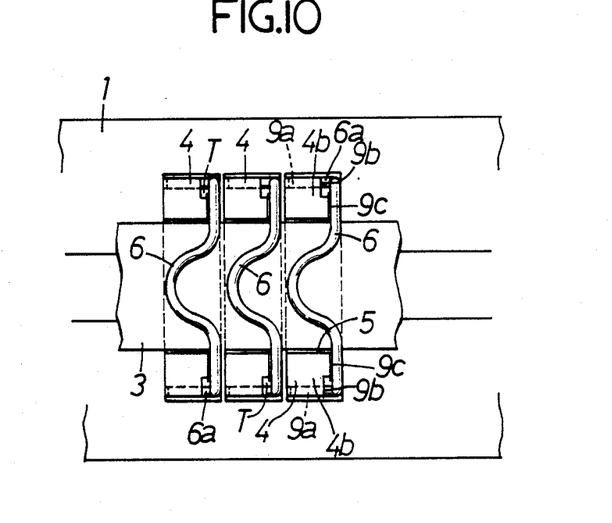
FIG. 10 is a top plan view of a part of the V-belt.
Figure 11:
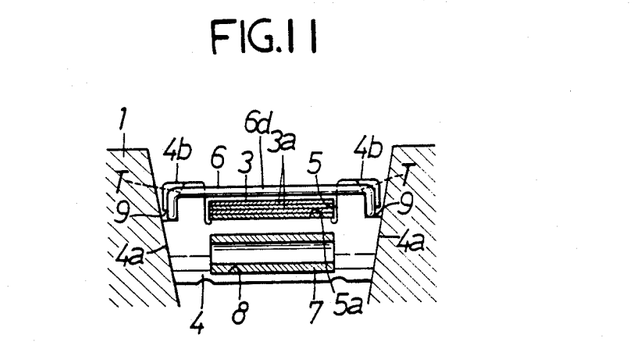
FIG. 11 is a sectional view taken along the line XI —XI of FIG. 9.

As shown in FIGS. 9 –11, a V-belt 2 engaging a V-pulley 1 has an endless metal band 3. The metal band 3 is formed by laminating a plurality of endless metal band elements 3a one on another and has its lower surface abutted in assembly against band supporting surfaces 5a of recessed grooves 5 which are made open upwards on respective V-shaped metal blocks 4. The metal band 3 is restrained and mounted to the metal blocks 4 by retaining wire-made stopper members 6 positioned in retaining grooves 9, 9 provided on the metal blocks 4. The metal blocks 4 are provided with semi-cylindrical recesses 8, 8 on opposite side surfaces thereof facing in the longitudinal direction of the metal band 3 and cylindrical roller members 7 are interposed between the opposed recesses 8, 8 of adjacent metal blocks 4 to achieve a connected or linked state therebetween. The illustrated example only shows V-shaped metal blocks of the type having the roller member 7 interposed therebetween for convenience of illustration.

Each of the V-shaped metal blocks 4 forming the V-belt 2 is, as shown in FIGS. 1 –7, basically similar in structure to the conventional one disclosed in FIG. 15 and comprises a recessed groove 5 disposed between a pair of upper wall parts 4b, 4b; inclined parts 4a, 4a for engagement with the V-pulley located on opposite sides of the block in the widthwise direction of the metal band 3; retaining grooves 9, 9 for receiving the stopper member 6; and the like.

However, the structure of retaining grooves 9 differs from that of the prior art. That is, each retaining groove 9 comprises a longitudinal groove portion 9a disposed above the inclined part 4a and extending in the longitudinal direction of the metal band 3, a vertical groove portion 9b communicating from above with one end of the longitudinal groove portion 9a and extending vertically in a tapered shape, and a lateral groove portion 9c extending horizontally and exposed at one end thereof to the upper part of the vertical groove portion 9b and open at the other end to the recessed groove 5. The lateral groove portion 9c has a narrower width than the vertical groove portion 9b. More specifically, the vertical groove portion 9b has one side surface facing in the widthwise direction of the metal block 4 or of the metal band 3 and said side surface is formed as a tapered surface T extending at an inclination from its upper end edge Ta exposed to the upper wall part 4b to its lower end edge Tb which is exposed to the longitudinal groove portion 9a. The tapered surfaces T and T thus provided in the two vertical groove portions 9b, 9b on the lateral opposite ends of the metal block 4 cooperate as a pair to form a tapered guide section G (see FIG. 2). The distance between the upper end edges Ta and Ta of the paired two tapered surfaces T and T, that is, the width $L_1$ (see FIGS. 1, 2 and 6), is set to be slightly smaller than the width $L_3$ between longitudinal portions 6a and 6a of the stopper member 6 in a free state prior to mounting (see FIG. 8). Further, the actual mounting width $L_2$ of V-shaped metal block 4 (the width between the lower end edges Tb and Tb of tapered surfaces T and T; see FIGS. 1, 2 and 6) is set to be larger than the afore-mentioned distance $L_3$ of the stopper member 6. Accordingly, these distances or widths $L_1$, $L_2$ and $L_3$ are set in a relationship of $L_1 < L_3 < L_2$. Moreover, the width $L_4$ of the tapered surface T measured in the longitudinal direction of the metal band 3 is determined to be larger than the width $L_5$ of the lateral groove portion 9c, measured in the same direction, into which a horizontal portion 6c of the stopper member 6 is fitted upon assembly ($L_4 > L_5$; see FIGS. 3 and 6).

Next, the assembly operation of this embodiment will be described.

Figure 1:
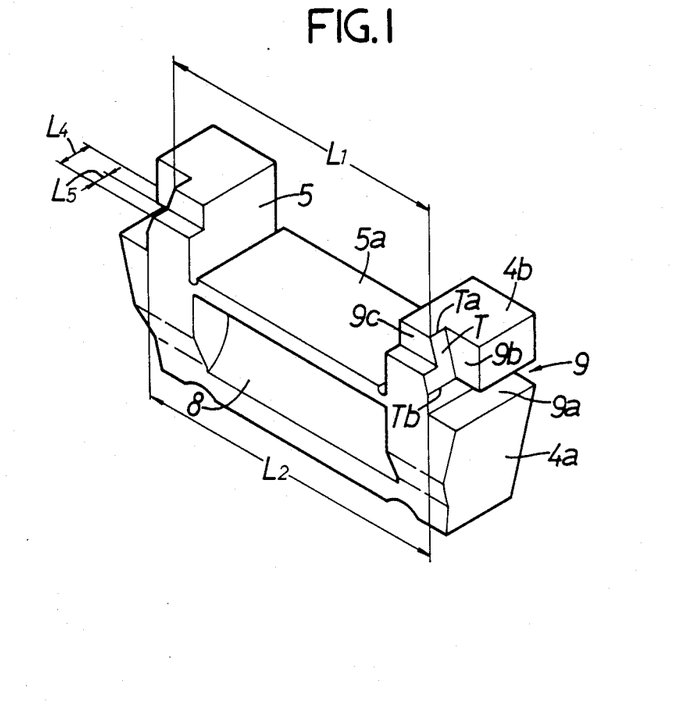
FIG. 1 is an enlarged perspective view of one embodiment of a V-shaped metal block for forming a power transmitting V-belt according to the invention.
Figure 2:
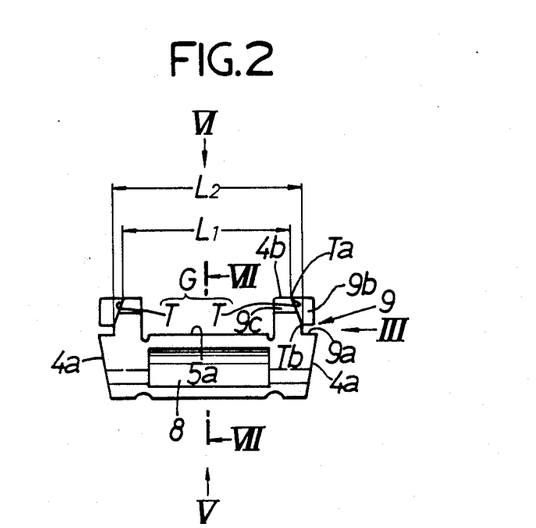
FIG. 2 is a front view thereof.
Figure 3:
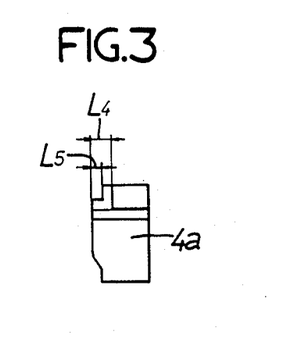
FIG. 3 is a right side view.
Figure 4:
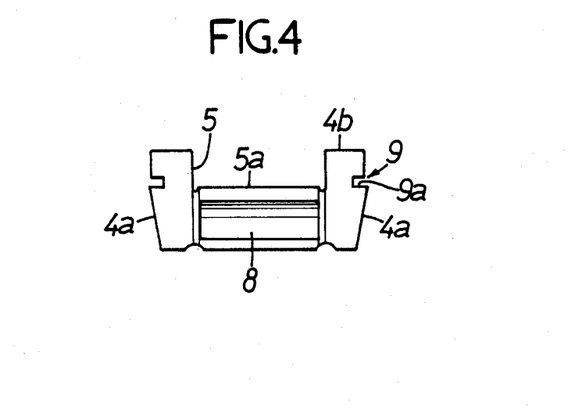
FIG. 4 is a rear view.
Figure 5:
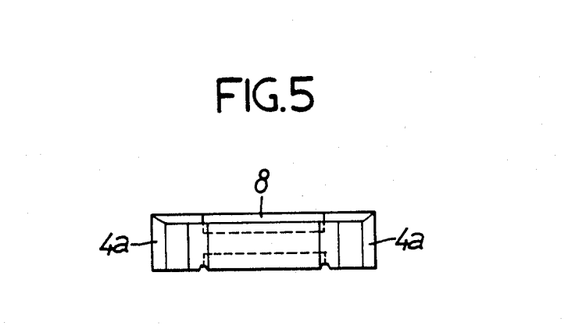
FIG. 5 is a bottom view seen in the direction of arrow V of FIG. 2.
Figure 6:
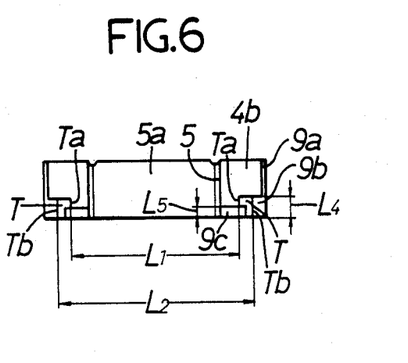
FIG. 6 is a top plan view seen in the direction of arrow VI of FIG. 2
Figure 7:
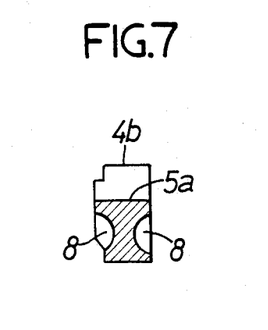
FIG. 7 is a sectional view taken along the line VII —VII of FIG. 2.
Figure 8:
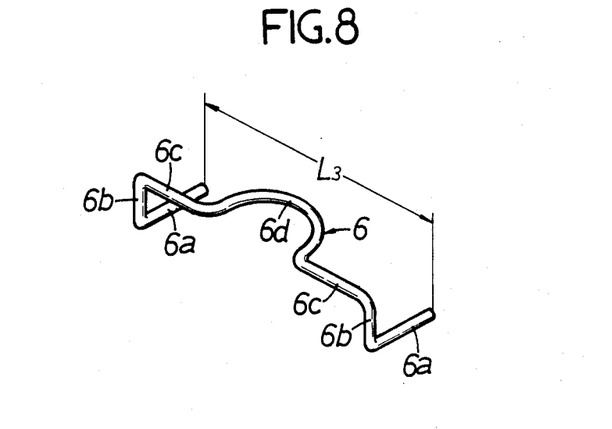
FIG. 8 is a perspective view of a stopper member.
Figure 12:
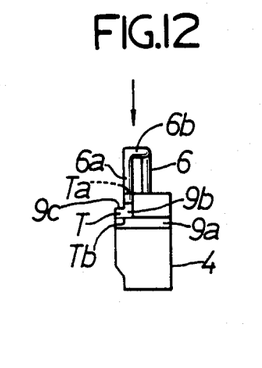
FIGS. 12 –14 are views showing the steps of mounting the stop to the V-shaped metal block.
Figure 13:
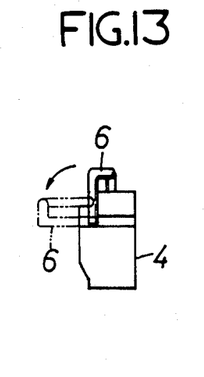
Figure 14:
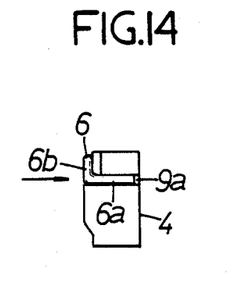

The procedure to be taken for mounting the stopper member 6 of FIG. 8 to the V-shaped metal block 4 at the time of assembly of the V-belt 2 is shown sequentially in FIGS. 12-14. First, as shown in FIG. 12, the stopper member 6 is held in its free state with the longitudinal portions 6a being stood vertically and is then moved down in the direction of an arrow found therein to bring the longitudinal portions 6a into slight abutment against the tapered surfaces T. Due to the relationship of $L_1 < L_3 < L_2$, the longitudinal portions 6a, 6a of stopper member 6 can engage the tapered surfaces T, T at a position vertically intermediate between the upper and lower end edges Ta and Tb without being disturbed by the upper end edges Ta, Ta.

Next, the stopper member 6 is pressed downwards while keeping the longitudinal portions 6a, 6a standing upright, which causes the stopper member 6 to be guided by the pair of tapered surfaces T, T and thereby to expand gradually its width $L_3$ between the longitudinal portions 6a, 6a. As a result, the longitudinal portions 6a, 6a ride over the lower end edges Tb, Tb and arrive at the position illustrated by the solid line in FIG. 13 at which they abut against the bottom surfaces of the longitudinal groove portions 9a, 9a. Since the bottom surfaces of the groove portions 9a, 9a extend over the whole width of the V-shaped metal block 4 in the longitudinal direction of the metal band 3, even if the stopper member 6 is pressed down strongly, it can reliably come into abutment against those bottom surfaces and there is no fear of the longitudinal portions 6a, 6a going downwards past the groove portions 9a, 9a. Furthermore, owing to the arrangement that the width $L_4$ of the tapered surface T measured in the lengthwise direction of the metal band 3 is set to be larger than the width $L_5$ of the lateral groove portion 9c, that is, the diameter of the wire material forming the stopper member 6, it is ensured that the longitudinal portions 6a can keep their engaged state with the tapered surfaces T even if said portions 6a slide in the longitudinal direction of the metal band 3 in the course of pressing down the stopper member 6 from the state abutting against the vertically intermediate portions on the tapered surfaces T, thus making reliable the displacement of the longitudinal portions 6a to the groove portions 9a.

The stopper member 6 is in a stressed state at the position shown by the solid line in FIG. 13. That is, the longitudinal portions 6a, 6a at the free ends of the stopper member 6 are in a state resiliently clamping the retaining grooves 9, 9 from opposite sides Accordingly, a relatively large force is required to release their engaged state.

Next the stopper member 6 is rotated by about 90 degrees in the direction of an arrow shown in FIG. 13 to the position shown by one-dot-chain line around the tips of longitudinal portions 6a, 6a. Then the stopper member 6 is pressed in the horizontal direction indicated by an arrow in FIG. 14 to achieve the illustrated engaged state. In this state, the longitudinal portions 6a, 6a of stopper member 6 resiliently clamp the longitudinal groove portions 9a, 9a from the opposite sides whereas the vertical portions 6b are engaged with the vertical groove portions 9b and the horizontal portions 6c are engaged with the lateral groove portions 9c.

As has been described above, the tapered surface which is a part of the vertical groove portion of retaining groove is efficiently utilized for mounting the stopper member to the V-shaped metal block. This facilitates the assembling work and the structure of the metal block itself need not be complicated as compared with that of a conventional one. Accordingly, the arrangement proposed herein contributes to enhancing the assembling characteristics and reducing the production cost.

What is claimed is:

1. A power transmitting V-belt comprising a multiplicity of V-shaped metal blocks linked to each other, an endless metal band and stopper members for holding said metal band on said V-shaped metal blocks, wherein each of said metal blocks includes a pair of retaining grooves distanced from each other and each of the stopper members includes a pair of free ends which are retained in the pair of retaining grooves, said pair of retaining grooves having parts which cooperate together to form a tapered guide section adapted to guide said pair of free ends of the stopper member from a free state thereof to a position retained in the retaining grooves at which the free ends of the stopper member are given stress therein.

2. A power transmitting V-belt according to claim 1, wherein said parts of the pair of retaining grooves are formed as tapered surfaces, respectively, and said tapered surfaces include one pair of end edges thereof set to have a first distance therebetween and another pair of end edges thereof set to have a second distance therebetween which is larger than said first distance, said pair of free ends of the stopper member being formed to have a distance therebetween which is larger than said first distance but smaller than said second distance.

3. A power transmitting V-belt according to claim 1, wherein said pair of retaining grooves are provided at widthwise opposite ends of the V-shaped metal block and each groove comprises a first groove portion extending in a longitudinal direction of the metal band and a second groove portion connected to said first groove portion and extending in a direction of thickness of the metal band, one of said first and second groove portions including a tapered surface inclining in a widthwise direction of the V-shaped metal block, the tapered surfaces on the pair of retaining grooves forming said tapered guide section.

4. A power transmitting V-belt according to claim 1, wherein said pair of retaining grooves are provided at widthwise opposite ends of the V-shaped metal block and each groove comprises a longitudinal groove portion extending in a longitudinal direction of the metal band, a vertical groove portion extending in a direction of thickness of the metal band from one end of said longitudinal groove portion and a lateral groove portion extending in a widthwise direction of the metal band from one end of the vertical groove portion, said vertical groove portion including a tapered surface facing in the widthwise direction of the metal band, the tapered surfaces on the pair of retaining grooves forming said tapered guide section.

5. A power transmitting V-belt according to claim 4, wherein said tapered surfaces provided in the vertical groove portions of the pair of retaining grooves each include one end edge exposed to an upper wall part of the metal block and another end edge exposed to said longitudinal groove portion, a distance between the one end edges of the tapered surfaces being set to be smaller than a distance between parts of said free ends of the stopper member in a free state thereof which come into engagement with the longitudinal groove portions whereas a distance between said another end edges of the tapered surfaces being set to be larger than said distance between said parts of the free ends of the stopper member.

6. A power transmitting V-belt according to claim 5, wherein each said tapered surface has a width in the longitudinal direction of the metal band set to be larger than a width of the lateral groove portion in the longitudinal direction of the metal band.

* * * * *

UNITED STATES PATENT AND TRADEMARK OFFICE
CERTIFICATE OF CORRECTION

PATENT NO. : 4,838,845

DATED : June 13, 1989

INVENTOR(S) : Torao Hattori & Minoru Nishimura

It is certified that error appears in the above-identified patent and that said Letters Patent is hereby corrected as shown below:

On the title page, item [73]:

Under "Assignee" add "Fukui Sinter Co., Ltd." as an Assignee to this patent.

Signed and Sealed this

Twenty-fifth Day of June, 1991

*Attest:*

HARRY F. MANBECK, JR.

*Attesting Officer*  *Commissioner of Patents and Trademarks*